United States Patent
Bombard et al.

(10) Patent No.: US 10,295,722 B2
(45) Date of Patent: May 21, 2019

(54) LIGHTING DEVICE

(71) Applicant: Valeo Systemes Thermiques, Le Mesnil Saint Denis (FR)

(72) Inventors: Stephane Bombard, Le Mesnil Saint Denis (FR); Maryline Thorailler, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 6 days.

(21) Appl. No.: 15/102,477

(22) PCT Filed: Dec. 12, 2014

(86) PCT No.: PCT/FR2014/000277
§ 371 (c)(1),
(2) Date: Jun. 7, 2016

(87) PCT Pub. No.: WO2015/086925
PCT Pub. Date: Jun. 18, 2015

(65) Prior Publication Data
US 2017/0036598 A1    Feb. 9, 2017

(30) Foreign Application Priority Data

Dec. 13, 2013    (FR) ...................................... 13 02927

(51) Int. Cl.
*F21V 8/00*    (2006.01)
*B60K 35/00*    (2006.01)
(Continued)

(52) U.S. Cl.
CPC .............. *G02B 6/003* (2013.01); *B60K 35/00* (2013.01); *B60K 37/04* (2013.01); *B60Q 3/14* (2017.02);
(Continued)

(58) Field of Classification Search
CPC ...... G02B 6/003; G02B 6/002; G02B 6/0045; G02B 6/0021; G02B 6/0035;
(Continued)

(56) References Cited

U.S. PATENT DOCUMENTS 6,193,383 B1 *   2/2001   Onikiri ................. F21V 7/0091
                                                          362/602
9,103,955 B2 *   8/2015   Zhou .................... G02B 6/0068
(Continued)

FOREIGN PATENT DOCUMENTS

DE    10 2008 006896 A1    8/2009
EP       2 264 493 A1     12/2010
FR       2 968 745 A1      6/2012

OTHER PUBLICATIONS

International Search Report issued in PCT/FR2014/000277 dated Mar. 2, 2016 (2 pages).
(Continued)

*Primary Examiner* — Y M. Lee
(74) *Attorney, Agent, or Firm* — Osha Liang LLP

(57) ABSTRACT

The invention relates to a lighting device (10) including a lighting source (12) and a light guide (14), the light guide including an inlet optical surface (20), configured to allow the entry of the light emitted by the light source illuminating the inlet optical surface, and an outlet optical surface (22), configured to allow the exit of the light from the light guide, characterized in that the light guide also includes at least two through-holes (30, 31) arranged passing through the inlet optical surface and the outlet optical surface.

13 Claims, 2 Drawing Sheets

Figure 1:
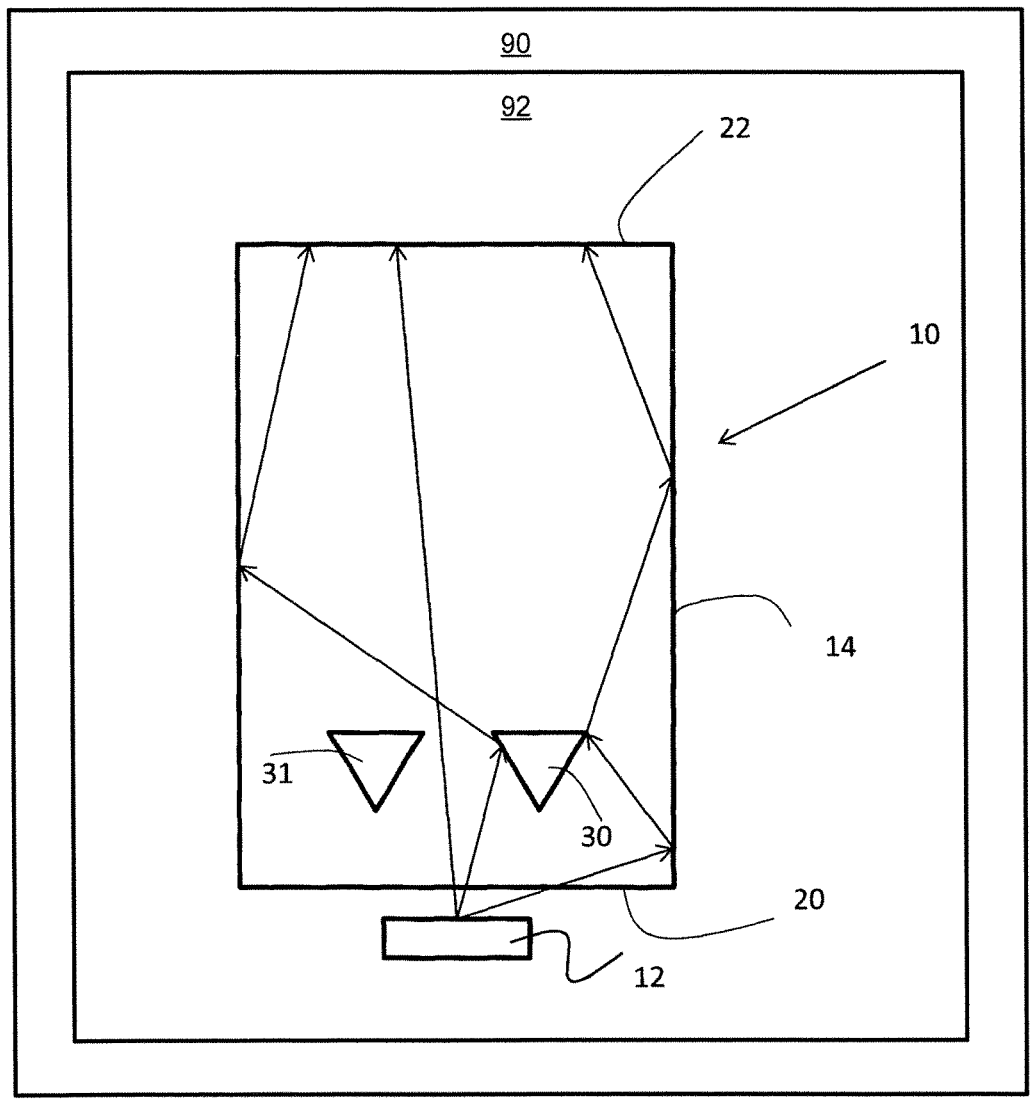

(51) Int. Cl.
*B60Q 3/64* (2017.01)
*B60Q 3/14* (2017.01)
*B60K 37/04* (2006.01)
*B60Q 3/78* (2017.01)

(52) U.S. Cl.
CPC .............. *B60Q 3/64* (2017.02); *G02B 6/002* (2013.01); *G02B 6/0045* (2013.01); *B60K 2350/203* (2013.01); *B60K 2350/2052* (2013.01); *B60Q 3/78* (2017.02)

(58) Field of Classification Search
CPC .......... G02B 6/0036; B60Q 3/14; B60Q 3/64; B60Q 3/78; B60K 37/04; B60K 2350/203; B60K 2350/2052; B60K 35/00
See application file for complete search history.

(56) References Cited

U.S. PATENT DOCUMENTS

| | | | |
|---|---|---|---|
| 2003/0099116 A1* | 5/2003 | Nousiainen | G02B 6/0018 362/559 |
| 2006/0285356 A1* | 12/2006 | Tseng | G02B 6/0016 362/613 |
| 2007/0274100 A1 | 11/2007 | Yang et al. | |
| 2009/0016057 A1* | 1/2009 | Rinko | G02B 6/0016 362/268 |
| 2012/0050649 A1* | 3/2012 | Yeo | G02B 6/002 349/65 |
| 2012/0147591 A1* | 6/2012 | Okada | F21V 5/00 362/84 |
| 2013/0063976 A1* | 3/2013 | Hong et al. | F21V 13/02 362/608 |
| 2015/0003094 A1* | 1/2015 | Gebauer et al. | G02B 6/0018 362/511 |
| 2015/0023056 A1* | 1/2015 | Fang | G02B 6/002 362/609 |

OTHER PUBLICATIONS

Written Opinion of the International Searching Authority issued in PCT/FR2014/000277 dated Mar. 2, 2016 (5 pages).

\* cited by examiner

LIGHTING DEVICE

The present invention relates to the field of lighting systems, and in particular, facia lighting systems, for example control panels of automobile vehicles, in which various lighting shapes and dimensions are generally sought for notably illuminating control buttons or indicator lights.

More specifically, the invention relates to a lighting device comprising a light source and a light guide, and also to an indicator light and a dashboard of an automobile vehicle designed notably for an automobile vehicle comprising such a lighting device.

The number of lighting devices present in the passenger compartment of an automobile vehicle increases with the sophistication of the vehicles. Some of these lighting devices are made visible to the user by means of a light source illuminating a dedicated area via a light guide.

In such devices, the distribution of the light over the whole of the area to be illuminated presents difficulties. Indeed, obtaining a uniform illumination is all the more complex when the area to be illuminated has a dimension in one direction greater than that of the light source employed. In particular, it is difficult to obtain a uniform illumination in the case of an area to be illuminated in the shape of a line.

In order to obtain this uniform illumination, it is generally necessary to multiply the number of light sources. However, the use of a large number of light sources presents difficulties of implementation, in particular in terms of space required and of electrical power supply.

Moreover, a large quantity of light sources may produce, aside from too much heat that risks interacting with other adjacent equipment, an increase in the power consumed.

Thus, there exists a need to provide a lighting device allowing a uniform illumination of an area to be illuminated one of whose dimensions is greater than that of the light source.

The invention thus provides a lighting device comprising a light source and a light guide, the light guide comprising:
 an entry optical interface configured to allow the entry of the light emitted by the light source illuminating the entry optical interface,
 an exit optical interface configured to allow the light to exit from the light guide.

The light guide furthermore comprises at least two through-holes disposed between the entry optical interface and the exit optical interface.

Advantageously, the through-holes of the lighting device according to the invention allow the distribution of the light rays coming from a light source in the main direction over a wider area of the exit optical interface with respect to the prior art.

The device according to the invention thus allows a uniform distribution of the light rays to be obtained on the exit optical interface and, as a consequence, a more uniform illumination, while at the same time limiting the number of light sources used.

The device according to the invention may also comprise one or more of the features hereinbelow, considered individually or according to all the technically possible combinations:
 the through-holes are V-shaped; and/or
 the points of the through-holes in the shape of a V are oriented in the direction of the entry optical interface; and/or
 the through-holes are closer to the entry optical interface than to the exit optical interface; and/or
 the through-holes are substantially at the same distance along the length of the light guide from the entry optical interface; and/or
 the device comprises at least three through-holes at least two of which are substantially at the same distance along the length of the light guide from the entry optical interface; and/or
 the light guide has a substantially rectangular parallelipipedic shape; and/or
 the thickness of the light guide is greater than or equal to 0.6 mm and less than or equal to 4 mm; and/or
 the through-holes pass through the light guide across the thickness of said light guide; and/or
 the entry optical interface comprises at least one light dispersive element; and/or
 the exit optical interface comprises at least one light dispersive element; and/or
 the light dispersive element takes the form of at least one semi-cylindrical lens; and/or
 the light source comprises at least one light-emitting diode disposed facing the entry optical interface.

The invention also relates to an indicator light notably intended for a dashboard of an automobile vehicle comprising a lighting device according to the invention.

The invention furthermore relates to a dashboard of an automobile vehicle having a human-machine interface comprising a lighting device according to the invention.

Figure 2:
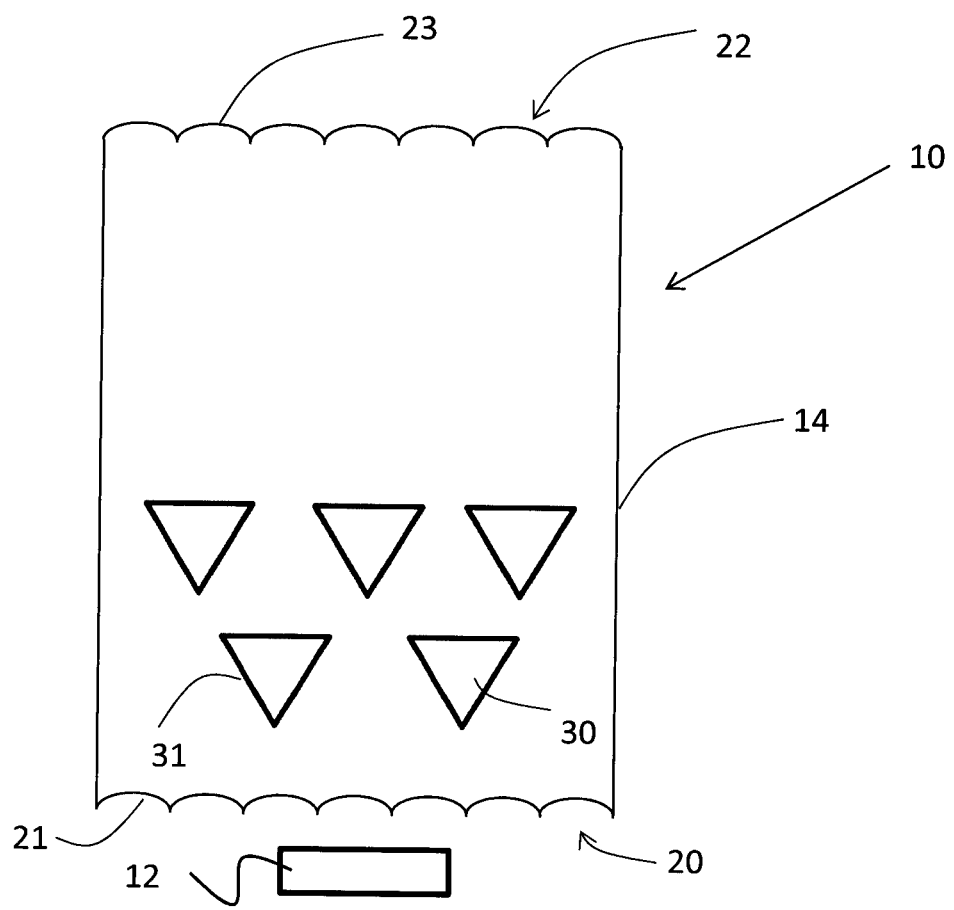

The invention will be better understood in the light of the following description, which is presented solely by way of example and which is not intended to limit said invention, accompanied by the figures hereinbelow:

FIG. 1 illustrating schematically a lighting device according to a first embodiment of the invention, and FIG. 2 illustrating schematically a lighting device according to a second embodiment of the invention.

As illustrated in FIG. 1, the invention relates to a lighting device 10 comprising a light source 12 and a light guide 14.

The lighting device, in accordance with an embodiment of the invention, is integrated in a human-machine interface (92) of a vehicle dashboard (90). Advantageously, the light guide 14 is monobloc and/or formed of a single material. Thus, the light propagates naturally by total internal reflection inside said light guide 14 without obstacle or separation between the parts of said guide that could be detrimental to the propagation of the light.

As shown in FIG. 1, the light guide 14 may have a substantially rectangular parallelepipedic shape. Typically, the thickness of the light guide 14 is in the range between 0.6 mm and 4 mm, for example around 0.8 mm, and the width of the light guide is in the range between 3 mm and 20 mm for a length of 10 mm to 60 mm.

The light guide 14 comprises an entry optical interface 20 and an exit optical interface 22.

The entry optical interface 20 is configured to allow the light emitted by the light source 12 to enter into the light guide 14. Advantageously, in order to limit the losses of light rays, the light source 12 is disposed facing the entry optical interface 20.

In order to reduce the space requirement and the electrical consumption, the light source 12 advantageously comprises at least one light-emitting diode disposed facing the entry optical interface. The light-emitting diode may be replaced by an equivalent light source of the OLED, AMOLED or FOLED type.

According to the embodiment illustrated in FIG. 2, the entry optical interface 20 can comprise light dispersive elements 21. These light dispersive elements may take the form of a semi-cylindrical lens.

Advantageously, the light dispersive elements 21 allow the scattering of the light rays coming from the source 12 penetrating into the light guide 14 via the entry optical interface 20.

The exit optical interface 22 is configured to allow the light to exit from the light guide 14.

According to the embodiment shown in FIG. 2, the exit optical interface 22 can comprise light dispersive elements 23. These light dispersive elements 23 may take the form of semi-cylindrical lenses. The dispersive elements 23 are used to disperse the light exiting from the light guide 14 via the exit optical interface 22 thus rendering the distribution of light more uniform at the exit of the lighting device.

According to the invention, the light guide 14 comprises at least two through-holes 31, 30 disposed between the entry optical interface 20 and the exit optical interface 22. Preferably, the through-holes pass through the light guide across the thickness of said light guide. The thickness of the light guide corresponds to the third dimension of said light guide, the other two being the length and the width.

Advantageously, the presence of through-holes within the light guide of the lighting device according to the invention allows a uniform illumination at the exit optical interface 22 to be obtained.

As shown in FIG. 1, at least one of the through-holes can have the shape of a V. Advantageously this shape for the through-holes offers an appropriate dispersion of the light within the light guide, thus enhancing the uniformity of the illumination on the exit optical interface.

Preferably, the through-holes in the shape of a V are oriented in the direction of the entry optical interface in order to further enhance the dispersive effect of said through-holes.

According to another embodiment, not shown, the through-holes may have a shape different from the V shape, for example a cylindrical or semi-cylindrical shape, with the proviso that, preferably, the holes are configured so as not to form an optical interface that is parallel to the entry optical interface.

In order to ensure a high uniformity of illumination on the exit optical interface, in particular by a mixing of the light rays within the light guide, the through-holes are disposed so as to be closer to the entry optical interface than to the exit optical interface. Preferably, the through-holes are disposed within the first quarter of the light guide along the length starting from the entry optical interface.

As shown in FIG. 1, the through-holes may be disposed substantially at the same distance along the length of the light guide from the entry optical interface.

Preferably, the through-holes are not contiguous with one another. Thus, a space is provided between the through-holes across the width of the light guide allowing a part of the light rays coming from the light source to propagate directly within the light guide i.e. without reflection, as far as the exit optical interface.

As illustrated in FIG. 2, the light guide may comprise several groups of through-holes disposed at various distances along the length of the light guide from the entry optical interface. The 'length' of the light guide is understood to mean the greatest of the dimensions of the light guide.

Advantageously, the presence of the several groups of through-holes allows the mixing of the light rays within the light guide, and thus the uniformity of the illumination of the exit optical interface, to be even further enhanced.

Preferably, the through-holes of the various groups are not contiguous with one another, and similarly, the various groups of through-holes are not contiguous with one another.

As illustrated in FIG. 1, the light rays represented by the arrows exiting from the light source 12 penetrate into the light guide 14 via the entry optical interface. The incoming beam of light rays is dispersed by the dispersive elements 21 disposed on said entry optical interface 20.

After having penetrated into the light guide 14, a part of the light rays pass directly, i.e. without reflection, through said light guide 14 from the entry optical interface 20 as far as the exit optical interface 22. These light rays pass between the through-holes 30, 31 and arrive at the exit optical interface 22 by following the cone of emission specific to the light source 12. These light rays propagate within the light guide 14 as if said light guide did not comprise any through-holes.

After having penetrated into the light guide 14, a part of the light rays is reflected by the optical interfaces formed by the sides of the through-holes. In view of the configuration of the through-holes, these light rays are deviated by total internal reflection in the direction of the optical interfaces formed by the sides of the light guide.

The light rays reflected by the optical interfaces formed by the sides of the light guide will subsequently either be reflected in the direction of the exit optical interface or be reflected on another optical interface formed by the sides of the light guide, or by one of the through-holes, in the direction of the exit optical interface 22.

All of the light rays exiting from the light guide at the exit optical interface 22 are dispersed by the dispersive elements 23.

Thus, the through-holes in the light guide of the lighting device according to the invention allow spreading of the beam of light rays propagating within the light guide and, as a consequence, a uniform illumination on the exit optical interface to be obtained.

The lighting device according to the invention may advantageously be used in indicator lights designed notably for a human-machine interface of an automobile vehicle, for example in devices of the back-lit strip type, and more generally, lighting devices whose area to be illuminated is substantially larger than the dimensions of the light sources used.

The invention claimed is:

1. A lighting device comprising:
   a light source; and
   a light guide that is monobloc and substantially rectangular parallelepipedic in shape, the light guide comprising:
      an entry optical interface located in a first plane and configured to allow the entry of the light emitted by the light source illuminating the entry optical interface,
      an exit optical interface located in a second plane facing the first plane and configured to allow the light to exit from the light guide, and
      at least two through-holes disposed between the entry optical interface and the exit optical interface,
         wherein the at least two through-holes are V-shaped, and
         wherein the at least two through-holes are spatially arranged to enable a component of the light, entering the light guide substantially in the direction of the length of the light guide, to directly pass through the light guide between the at least two through-holes without reflection or being affected by the through-holes,
wherein the points of the at least two V-shaped through-holes are oriented in the direction of the entry optical interface.

2. The device as claimed in claim 1, in which the through-holes are closer to the entry optical interface than to the exit optical interface.

3. The device as claimed in claim 1,
wherein the at least two through-holes are substantially at a same first distance along the length of the light guide from the entry optical interface,
wherein the light guide further comprises at least one additional through-hole disposed at a second distance along the length of the light guide from the entry optical interface, and
wherein the second distance is greater than the first distance.

4. The device as claimed in claim 1, in which the thickness of the light guide is greater than or equal to 0.6 mm and less than or equal to 4 mm.

5. The device as claimed in claim 1 in which the through-holes pass through the light guide across the thickness of said light guide.

6. The device as claimed in claim 1, in which the entry optical interface comprises at least one light dispersive element.

7. The device as claimed in claim 1, in which the exit optical interface comprises at least one light dispersive element.

8. The device as claimed in claim 7, in which the light dispersive element takes the form of at least one semi-cylindrical lens.

9. The device as claimed in claim 1, in which the light source comprises at least one light-emitting diode disposed facing the entry optical interface.

10. An indicator light notably intended for a human-machine interface of an automobile vehicle comprising a lighting device as claimed in claim 1.

11. A human-machine interface of an automobile vehicle comprising a lighting device as claimed in claim 1.

12. A dashboard of an automobile vehicle comprising a human-machine interface as claimed in claim 11,
wherein the human-machine interface is integrated in the dashboard, and
wherein the lighting device is configured to illuminate at least one element of the human-machine interface.

13. The device as claimed in claim 6, in which the light dispersive element takes the form of at least one semi-cylindrical lens.

* * * * *